Figure 1:
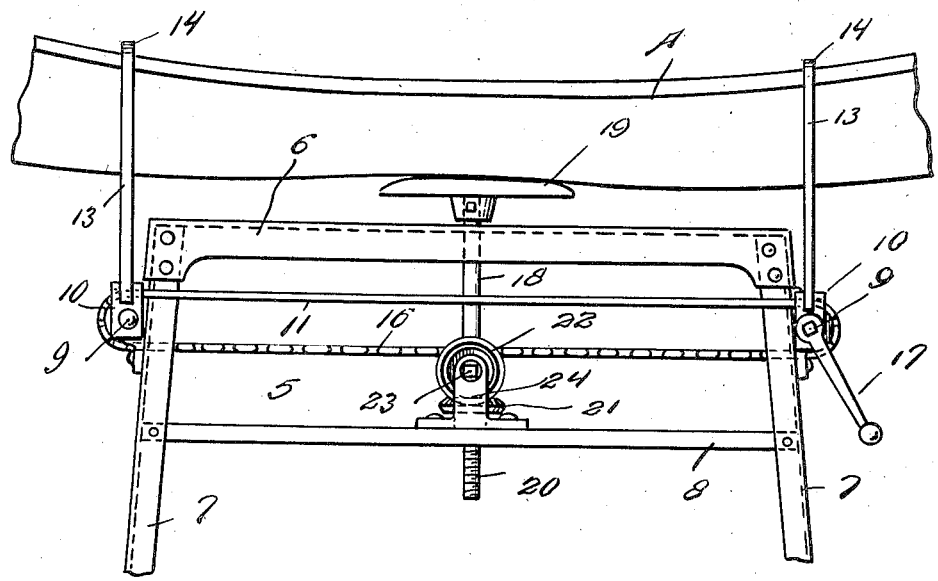

Aug. 10, 1926.

F. R. SIMPSON 1,595,883

TIRE SPREADING MACHINE

Filed Feb. 7, 1924     2 Sheets-Sheet 1

F. R. Simpson,
INVENTOR.

BY 
ATTORNEYS.

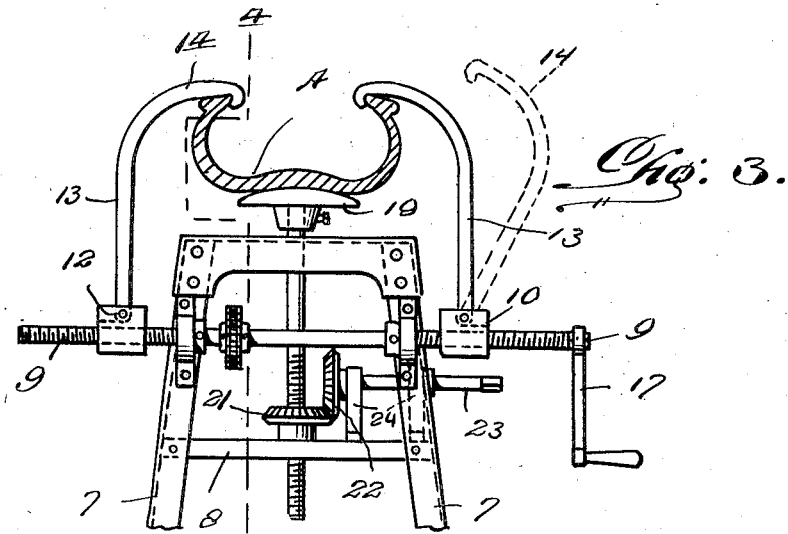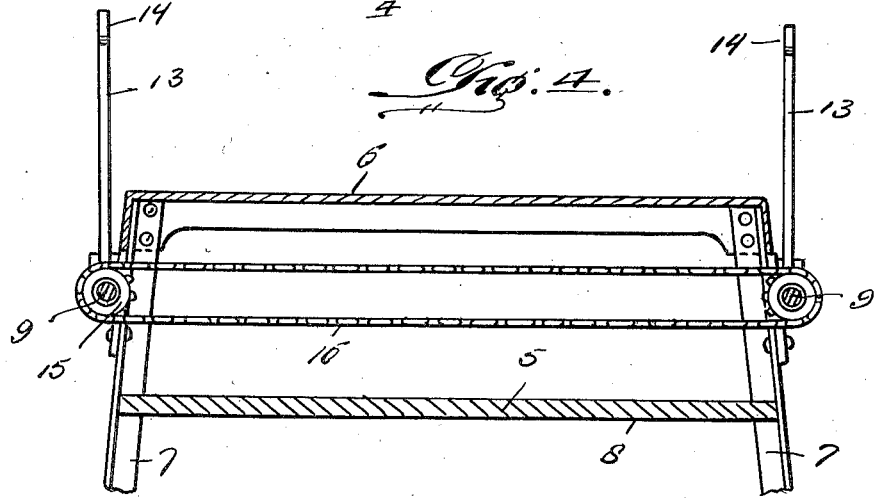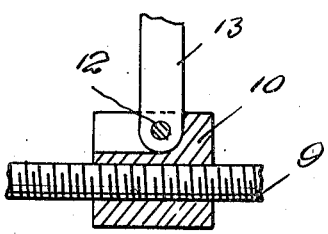

Patented Aug. 10, 1926.

1,595,883

UNITED STATES PATENT OFFICE.

FLOYD R. SIMPSON, OF MANKATO, MINNESOTA, ASSIGNOR TO F. & F. MANUFACTURING COMPANY, OF FARIBAULT, MINNESOTA.

TIRE-SPREADING MACHINE.

Application filed February 7, 1924. Serial No. 691,202.

This invention relates to a machine to be employed in the general art of manufacturing or repairing the shoes of pneumatic tires and has more particular reference to a machine that is specifically adapted for use in the spreading of the tires whereby the interior of the same may be readily viewed for the repairing, cleaning or other necessary operations on the same.

The primary object of the invention resides in the provision of such a machine wherein a relatively great area of the tire will be spread and this is an extremely simple and novel manner.

Yet another object of the invention resides in the provision of a tire spreading machine wherein the same includes a plurality of cooperating spreading members that are controlled simultaneously in either an inward or outward direction by a single operating mechanism.

Yet another object is to provide a machine of the above character wherein the spreading members per se may be swung in directions toward or away from the tire as occasion demands.

With the foregoing and other objects in view, as the nature of the invention will be better understood, the same comprises the novel form, combination and arrangement of parts hereinafter more fully described, shown in the accompanying drawings and claimed.

Figure 2:
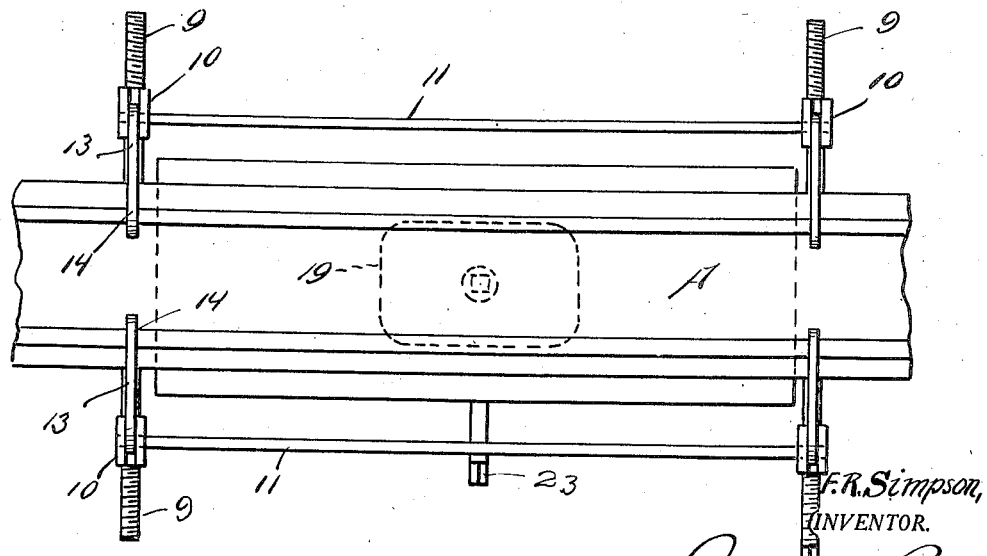
Figure 2:

In the drawings, wherein like reference characters indicate corresponding parts throughout the different views:

Figure 1 is a side elevational view of a tire spreading machine constructed in accordance with the present invention, the same being shown as actually in use, Figure 2 is a top plan view thereof, Figure 3 is an end elevational view of the machine, the tire being shown in cross section so as to more clearly disclose the relationship of certain of the spreading elements with the opposite edges of the tire shoe, Figure 4 is a detailed vertical cross sectional view taken substantially upon the line 4—4 of Figure 3, and, Figure 5 is an enlarged sectional view of one of the movable spreader hook carrying blocks movable in opposite directions upon one of the threaded ends of its cooperating operating shaft that form an essential part of the present invention.

Now having particular reference to the drawings, my novel tire spreading machine includes a desirable form of stand 5 consisting of a top board 6 and corner supporting legs 7, which supporting legs 7 are interconnected at a point beneath said top board 6 by a horizontal shelf 8.

Journaled within bearings upon opposite ends of the stand 5, are cross shafts 9—9, the opposite ends of which extend outwardly of the opposite sides of said stand 5 and are screw threaded in opposite directions as clearly shown in Figures 2 and 3.

Threaded upon the threaded ends of each of said shafts 9—9, are blocks 10 and the blocks upon similar sides of the machine stand 5 are interconnected by rods 11 for insuring uniform movement of the blocks with respect to each other.

Pivotally secured within channels formed at the upper edge of each block as at 12, is an upwardly extending arm 13 that terminates at its free end in a forwardly extending hook portion 14 that is adapted for engagement over the adjacent edge of the tire shoe A that is disposed vertically upon the top board 6 of said machine stand 5.

Each shaft 9 carries intermediate the adjacent end legs 7 of the machine stand, a sprocket gear 15, the sprocket gears of the shafts at the opposite ends of the stand being interconnected through the medium of a sprocket chain 16, whereby a rotation of one of said shafts 9 through the medium of a hand crank 17 will impart a simultaneously rotation of both of said shafts and a consequent inward or outward movement of the respective hook arms 14 upon opposite ends of said shafts 9—9.

It will thus be seen that after the tire A has been positioned upon the top board 6 of the stand 5 in the manner as clearly shown in Figure 1, 2 and 3, the hooked arms 13 may be swung over upon the blocks 12 to engage the opposite edges of said tire, after which a turning of the shaft 9 that carries the hand crank 17 in a certain direction, will cause the outward movements of the hooked arms upon the opposite sides of the stand for consequently spreading the tire in an obvious manner.

Extending vertically through alined openings intermediate the ends of the top board 6 and shelf 8 of the stand 5, is a shaft 18 that is equipped at its upper end with a detachable tire tread engaging plate 19. The lower end of this shaft 18 is threaded as at 20 and upon which is threaded a bevelled gear 21 that has mesh with a bevelled gear 22 upon the inner end of a transverse shaft 23 which is journaled in suitable bearings 24 upon said shelf 8. The end of this shaft 23 is adapted for the reception of a hand crank 17 and it will be obvious that after the tire A has been spread to the desired degree, said shaft 23 may be rotated for obviously imparting a vertical movement to the shaft 18 whereupon the desired portion of the tire shoe A will be bulged upwardly in a manner as clearly shown in Figure 3 for allowing that particular portion of the tire shoe to be cleaned, scraped or otherwise worked upon as desired.

From the foregoing, it will be apparent to those skilled in the art that I have provided a highly useful and simple form of tire spreading machine and one that will meet with all of the requirements for a successful commercial use.

Minor changes may be made in the invention without departing from the spirit and scope of the appended claims.

Having thus described my invention, what I claim as new and desire to secure by Letters Patent is:—

1. A tire spreading machine including, in combination, a stand, a shaft journaled in the stand, means for operating the shaft, a pair of blocks threaded on the shaft to move in opposite directions in relation to each other upon rotation of the shaft, a pair of hooks, means for pivoting the hooks to the blocks in order that they may swing from an upright position in relation to the blocks away from each other, and means preventing the hooks from swinging from an upright position toward each other.

2. A tire spreading machine including, in combination, a stand, a shaft, a pair of blocks on the shaft, means for rotating the shaft to operate the blocks toward and away from each other, a pair of hooks, each hook provided with a recess extending inwardly from the inner end thereof, a pair of pivots for pivoting the hooks to the blocks in order that said hooks may swing from an upright position in relation to the blocks away from each other, and means for preventing the hooks from swinging from said upright position toward each other.

3. A tire spreading machine including, in combination, a stand, a pair of shafts journaled upon the stand, means for rotating the shafts simultaneously, blocks threaded upon the shafts in such a manner as to move in opposite directions when the shafts are rotated, a pair of hooks, means for pivoting the hooks to the blocks in order that said hooks may swing from an upright position in relation to the blocks away from each other, and means for preventing the hooks from swinging from said upright position toward each other.

In testimony whereof I affix my signature.

FLOYD R. SIMPSON.